(12) United States Patent
Hessbrueggen

(10) Patent No.: US 9,211,621 B2
(45) Date of Patent: Dec. 15, 2015

(54) MACHINING APPARATUS

(71) Applicant: Markus Hessbrueggen, Goeppingen (DE)

(72) Inventor: Markus Hessbrueggen, Goeppingen (DE)

(73) Assignee: EMAG HOLDING GMBH, Salach (DE)

( * ) Notice: Subject to any disclaimer, the term of this patent is extended or adjusted under 35 U.S.C. 154(b) by 213 days.

(21) Appl. No.: 14/100,047

(22) Filed: Dec. 9, 2013

(65) Prior Publication Data

US 2014/0157559 A1     Jun. 12, 2014

(30) Foreign Application Priority Data

Dec. 7, 2012   (DE) .......................... 10 2012 023 973

(51) Int. Cl.
*B23Q 3/155*   (2006.01)
*B23Q 39/02*   (2006.01)
*B23Q 7/04*    (2006.01)
*B23Q 39/00*   (2006.01)

(52) U.S. Cl.
CPC ........ *B23Q 3/15506* (2013.01); *B23Q 3/15566* (2013.01); *B23Q 7/04* (2013.01); *B23Q 39/02* (2013.01); *B23Q 39/026* (2013.01); *B23Q 2039/004* (2013.01); *Y10T 29/5109* (2015.01); *Y10T 29/5154* (2015.01); *Y10T 82/2511* (2015.01); *Y10T 483/16* (2015.01); *Y10T 483/1702* (2015.01); *Y10T 483/1726* (2015.01)

(58) Field of Classification Search
CPC .. B23Q 3/155; B23Q 3/15506; B23Q 3/1556; B23Q 3/15566; Y10T 82/2504; Y10T 82/2506; Y10T 82/2511; Y10T 483/16; Y10T 483/1702; Y10T 483/1705; Y10T 483/1707; Y10T 483/171; Y10T 483/1719; Y10T 483/1726
USPC .......... 483/14, 17, 18, 19, 20, 24, 27; 82/120, 82/121, 122
See application file for complete search history.

(56) References Cited

U.S. PATENT DOCUMENTS

| | | | |
|---|---|---|---|
| 6,228,006 B1 * | 5/2001 | Horn | B23Q 3/15733 483/55 |
| 6,904,665 B2 * | 6/2005 | Walz | B23Q 7/045 198/377.07 |

FOREIGN PATENT DOCUMENTS

| | | | | |
|---|---|---|---|---|
| DE | 102004028172 A1 * | 12/2005 | | B23B 3/168 |
| DE | 102004038005 B3 * | 1/2006 | | B23B 3/168 |
| DE | 102005011306 A | 9/2006 | | |
| DE | WO 2007016910 A2 * | 2/2007 | | B23B 1/00 |

* cited by examiner

*Primary Examiner* — Erica E. Cadugan
*Assistant Examiner* — Michael Vitale
(74) *Attorney, Agent, or Firm* — Andrew Wilford

(57) ABSTRACT

A frame defines a workpiece-transfer station, a machining station, and a tool station all centered on a common vertical plane. A carousel in the tool station carries a plurality of tools having shanks. A slide movable vertically and horizontally in the plane carries a tool head rotatable about a vertical axis itself having a tool socket adapted to fit shanks of the tools and a workpiece grab. This tool head can move horizontally in the plane to pick up and drop off tools and move workpieces between the transfer and the machining station, and can also move vertically during machining of a workpiece rotating in the machining station.

7 Claims, 2 Drawing Sheets

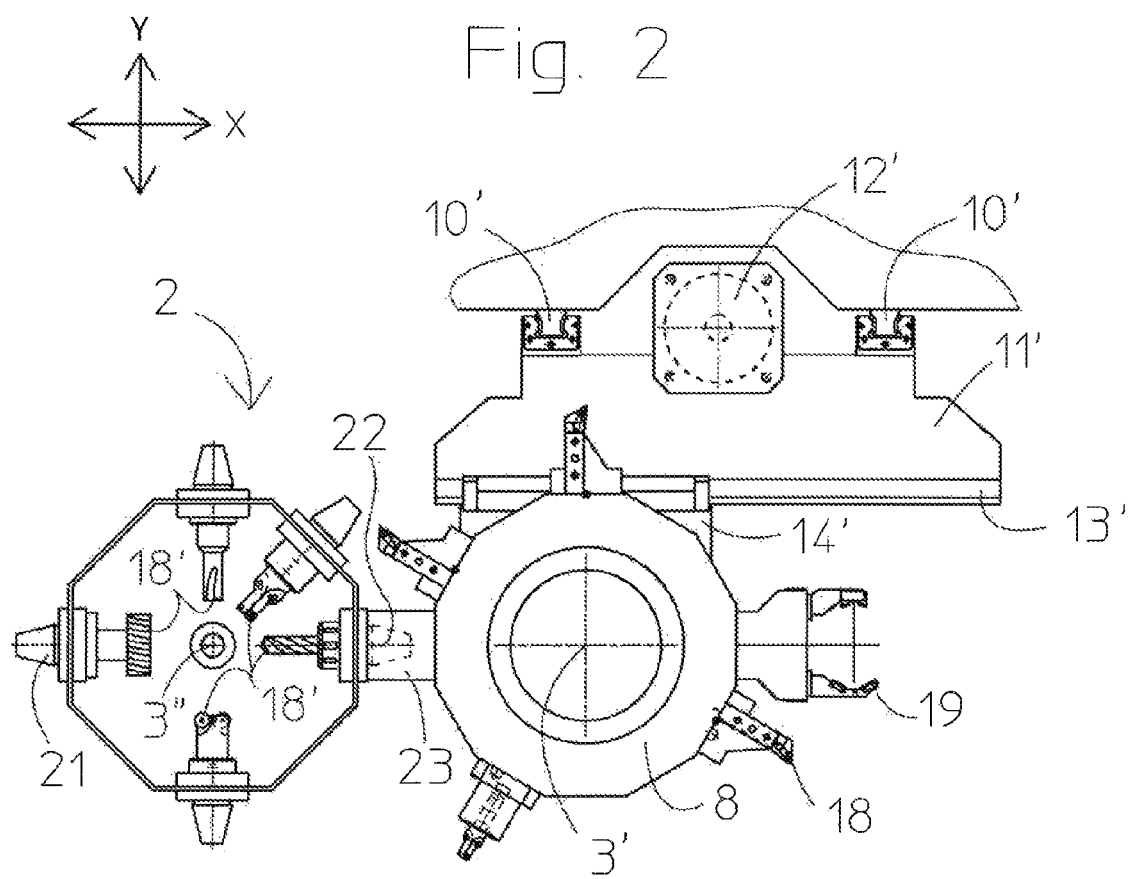

MACHINING APPARATUS

FIELD OF THE INVENTION

The present invention relates to a machining apparatus. More particularly this invention concerns the rotary machining of elongated or shaft-shaped workpieces.

BACKGROUND OF THE INVENTION

A machine is known from DE 10 2005 011 306 where a frame defines a station for workpiece pickup and/or dropoff and a drive spindle defines a machining station for holding one of the workpieces and rotating the held workpiece on the frame about a vertical axis horizontally offset from the station. A carousel on the frame rotatable about a vertical axis horizontally offset from the machining station and carrying a plurality of tools having shanks. A vertical guide on the frame carries a vertical slide for movement in a vertical direction on the frame, and a horizontal guide on the vertical slide carries a horizontal slide for movement in a horizontal direction on the vertical slide between a position juxtaposed with the machining station and positions juxtaposed with the carousel and with the transfer station. A tool head is rotatable about a vertical axis on the horizontal slide and carries at least one tool socket adapted to fit the tool shanks and, angularly offset therefrom, a workpiece grab. This tool head can move horizontally in two directions to pick up and drop off tools and move workpieces between the transfer station and the machining station, and can also move vertically during machining of a workpiece rotating in the machining station.

Thus this equipment is quite complex, requiring numerous guides and actuators for movement of the tool head in three dimensions, and as a result the control system is also fairly complicated.

OBJECTS OF THE INVENTION

It is therefore an object of the present invention to provide an improved machining apparatus.

Another object is the provision of such an improved machining apparatus that overcomes the above-given disadvantages, in particular that is significantly simpler than the prior-art machines.

SUMMARY OF THE INVENTION

This object is attained according to the invention in that the tool carousel is positioned such that the tool head can get to it while moving within a single plane defined by the horizontal direction it moves in for moving workpieces between the transfer station and the machining station and the vertical direction it moves in during machining.

Thus with this system the slides and tool head move only in a vertical plane while moving workpieces to and from the transfer station to the machining station and while changing tools. No movement perpendicular to this plane is needed, thereby greatly simplifying the mechanism and its control.

BRIEF DESCRIPTION OF THE DRAWING

The above and other objects, features, and advantages will become more readily apparent from the following description, reference being made to the accompanying drawing in which:

FIG. 2 is a partly sectional top view of a detail of FIG. 1.

SPECIFIC DESCRIPTION OF THE INVENTION

Figure 1:
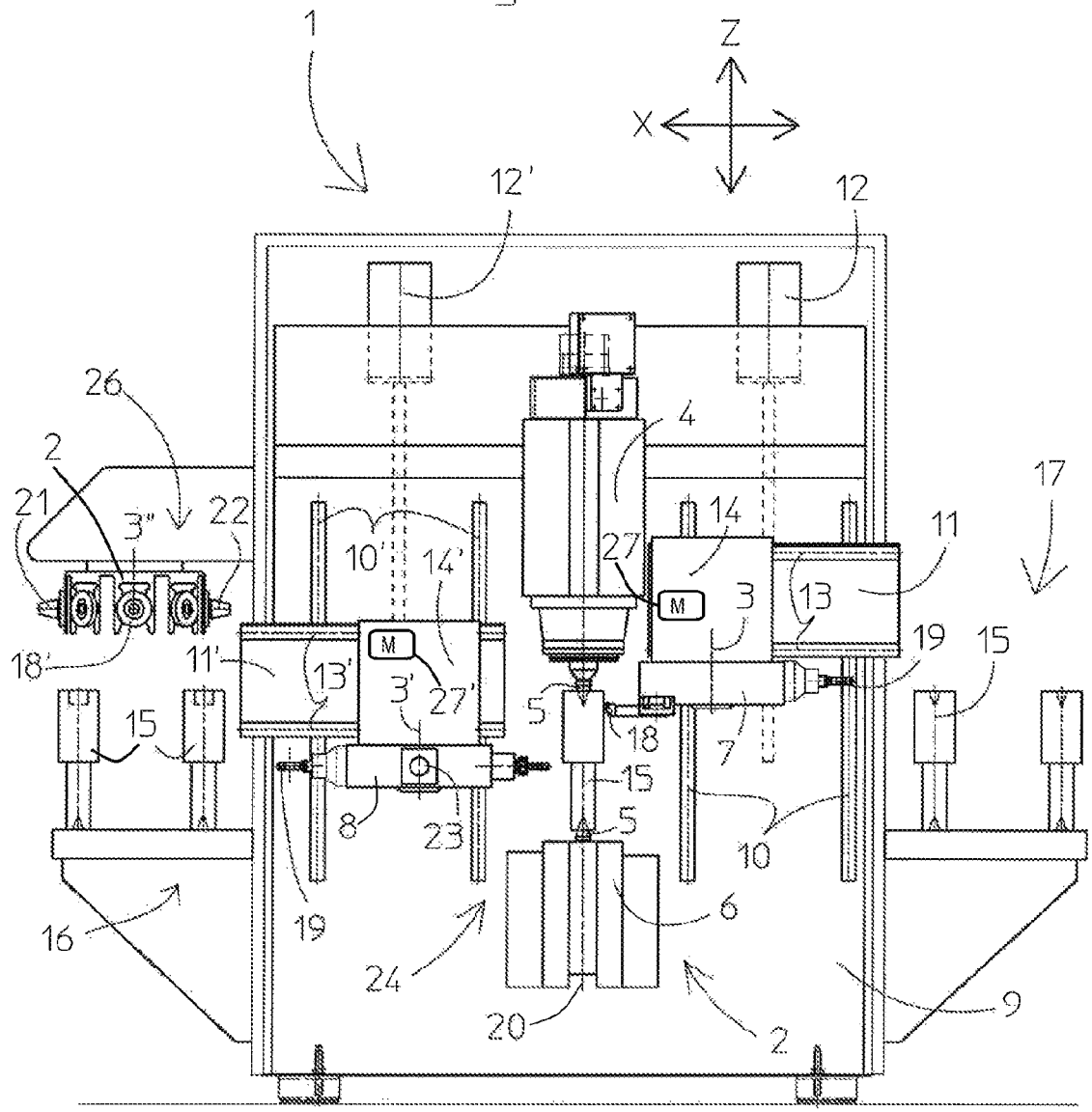
FIG. 1 is a partly schematic side view of the apparatus of this invention.

As seen in FIG. 1 an apparatus 1 for machining elongated shaft-shaped workpieces has a frame 9 lying between an input or transfer station 16 to which unmachined workpieces 15 are supplied and an output station 17 from which finish-machined workpieces 14 can be removed in a horizontal direction Y (FIG. 2). A drive spindle 4, a tail spindle 6, and a pair of holders 5 that can be center points or chucks constitute means defining a vertical machining axis 25 in a central machining station 24.

The frame 9 also supports two sets of vertical guide rails 10 and 10' on which respective slides 11 and 11' can be moved in a vertical direction Z by a respective motor 12 and 12'. The slides 11 and 11' in turn are provided with horizontal guide rails 13 and 13' on which respective horizontal slides 14 and 14' can move horizontally in the direction Y. The slides 14 and 14' carry respective revolving tool heads 7 and 8 rotatable about respective vertical carousel axes 3 and 3'. Further motor/spindle arrangements like the motors 12 and 12' serve for horizontal movement of the slides 145 and 14' on the slides 11 and 11'.

According to the invention there could be only the revolving tool head 8 and a single station 16 used for both picking up and dropping off workpieces 15. Here however there are two tool heads 7 and 8 so that, as one workpiece 15 is being loaded from the input station 16 a finished workpiece 15 can be dropped off in the output station 17.

The revolving heads 7 and 8 are each provided with at least one grab 19 capable of gripping a workpiece 17 and moving it from the respective station 16 or 17 into the central machining station 24, with motors 27 and 27' rotating the heads 7 and 8 through 180° about the respective axes 3 and 3' as they move from the central machining station 25 to the respective stations 16 and 17. In addition as shown in FIG. 2 the head 8 carries at least one holder 23 having a seat or socket 22 adapted to hold a shank 21 of a tool 18', here a HSK or hollow-taper shank. In addition the head 8 can carry a plurality of standard tools 18, with the head 8 here carrying three standard tools 18 that are fixed on the head 8 and serve for various lathing operations, along with one grab 19 and two HSK seats 23. The other head 7 can have for example a single grab 19 and five standard tools 18.

Above the input station 16 is a tool station 26 holding a tool carousel 2 rotatable about an axis 3' and carrying a number of angularly offset tools 18' with the HSK shafts 21 that fit in the seat 22. This axis 3" is parallel to the two axes 3 and 3' and coplanar with the horizontal and vertical directions X and Z. Thus when, for instance, one of the tools 18 of the head 17 is machining a workpiece 15 in the station 20, the head 8 can shift in the horizontal direction X with its slide 14' on the slide 11' while this slide 11' moves upward in the direction Z so as to horizontally align the head 8 with the carousel 2 in order that tools 18' can be picked up or dropped off, all under computer control of the various respective actuators or drive motors.

I claim:

1. An apparatus for machining workpieces, the apparatus comprising:
    a frame defining a first workpiece transfer station;
    means on the frame defining a machining station for holding one of the workpieces and rotating the held workpiece on the frame about a vertical axis offset in a horizontal direction from the transfer station;

a carousel on the frame vertically aligned with the first transfer station, rotatable about a vertical axis offset in the horizontal direction from the machining station, and carrying a plurality of tools having shanks;

a vertical guide on the frame;

a vertical slide carried on the vertical guide and shiftable therealong in a vertical direction on the frame;

a horizontal guide on the vertical slide;

a horizontal slide carried on the horizontal guide and shiftable therealong in the horizontal direction on the vertical slide between a position juxtaposed with the machining station and positions juxtaposed with the carousel and with the transfer station; and a first tool head rotatable about a vertical axis on the horizontal slide and carrying a workpiece grab and, angularly offset therefrom, a tool socket adapted to fit the tool shanks, whereby, on movement in the horizontal direction of the horizontal slide and rotation of the first tool head, the first tool head can move a workpiece by the grab between the first transfer station and the machining station and can move a tool by the tool socket between the carousel and the machining station to machine a rotating workpiece therein.

2. The machining apparatus defined in claim 1, wherein the vertical axis of the first tool head, the vertical axis of the machining station, and the horizontal direction of movement of the first tool head all define and lie in a vertical plane.

3. The machining apparatus defined in claim 2, wherein the carousel is direct above the transfer station.

4. The machining apparatus defined in claim 2, further comprising:
   means for pivoting the first tool head about the respective vertical axis while shifting the horizontal slide between the machining station on one side and either the carousel or the first transfer station on the other side.

5. The machining apparatus defined in claim 1, wherein the tool shanks and the tool socket are complementarily tapered.

6. The machining apparatus defined in claim 5, wherein the shafts are of the hollow-taper shank type.

7. The machining apparatus defined in claim 1, further comprising:
   a second workpiece transfer station, the first transfer station and the second transfer station horizontally flanking the machining station; and
   a second tool head horizontally movable between the second transfer station and the machining station.

* * * * *